C. J. CARLSON.
CONVERTIBLE AUTOMOBILE BODY.
APPLICATION FILED SEPT. 15, 1917.
1,272,620.
Patented July 16, 1918.
4 SHEETS—SHEET 1.
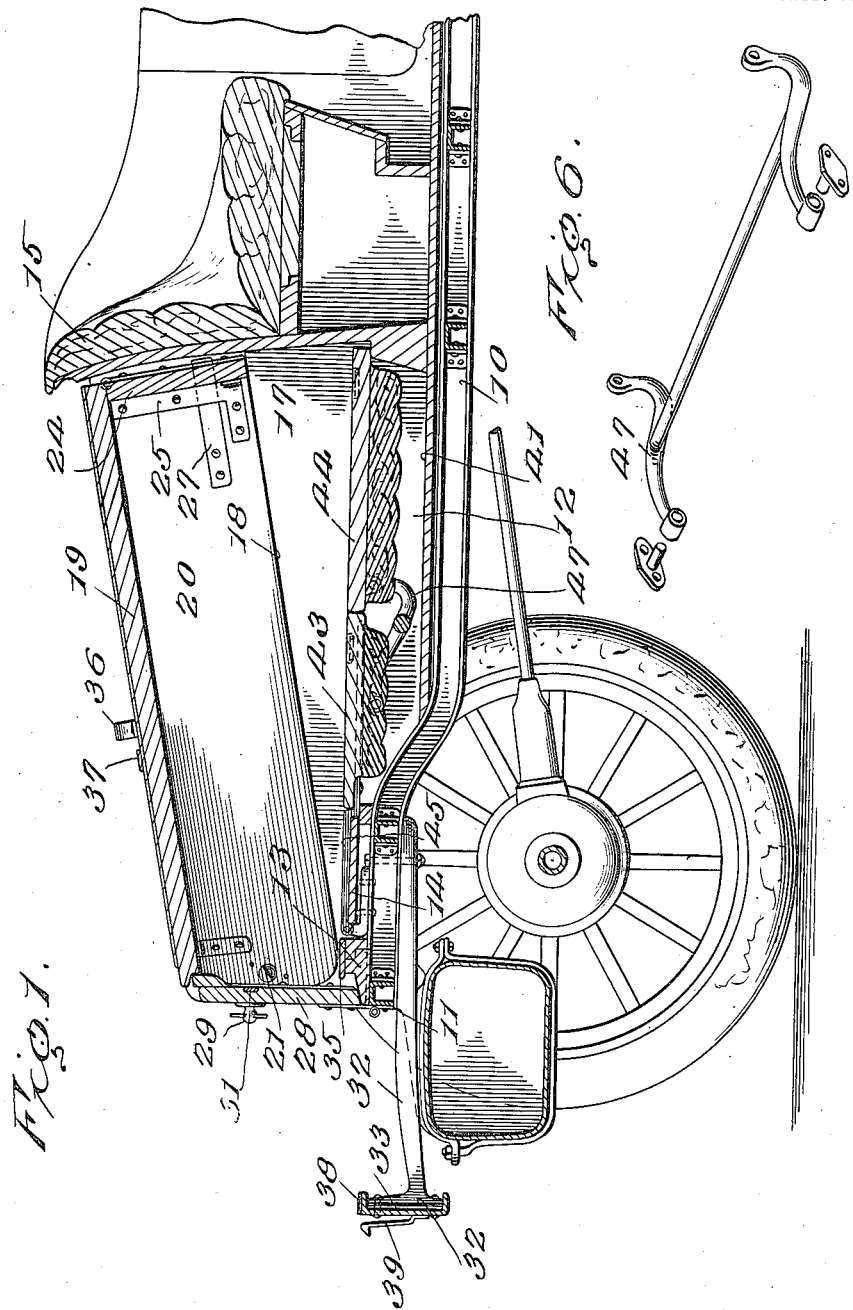
Inventor
Charles J. Carlson
By ............., Attorneys.

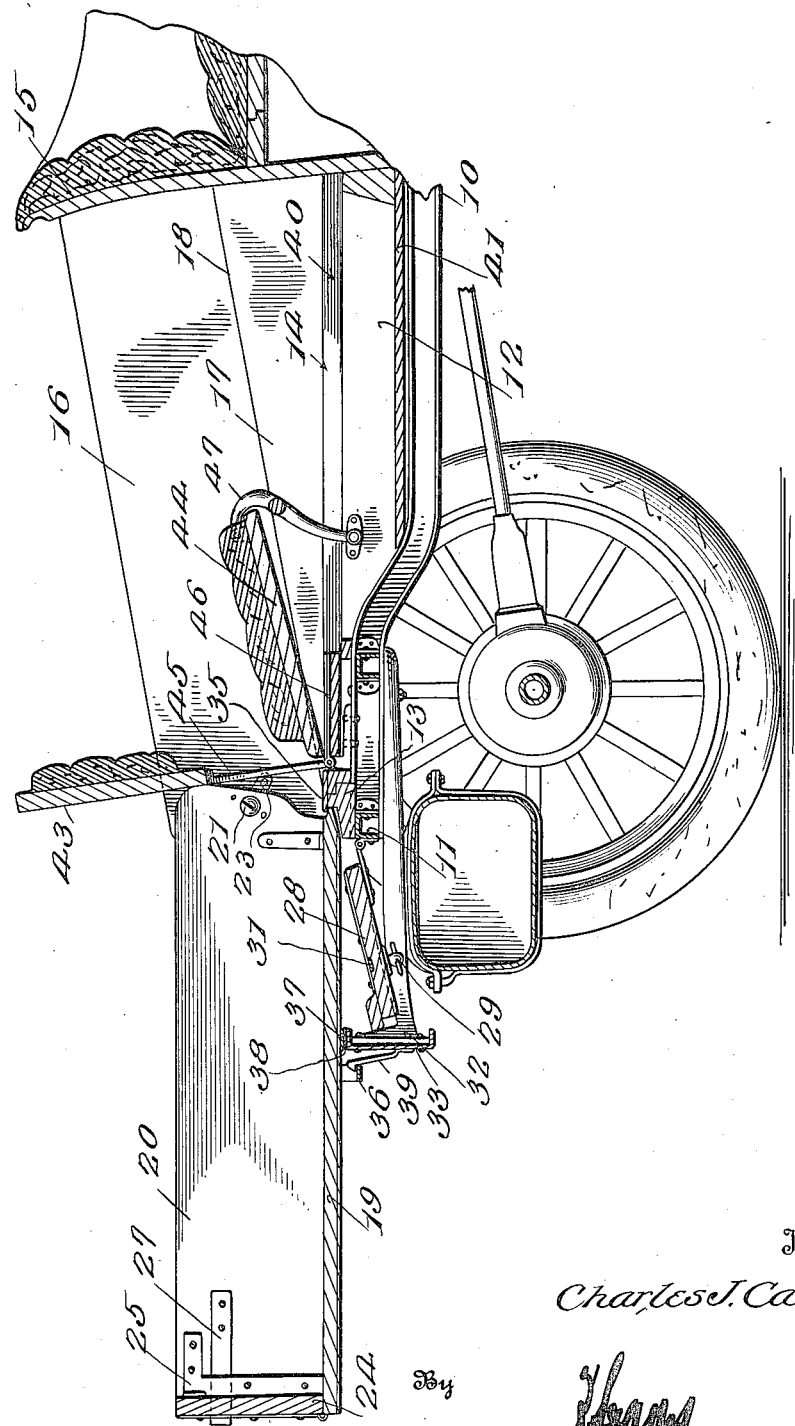

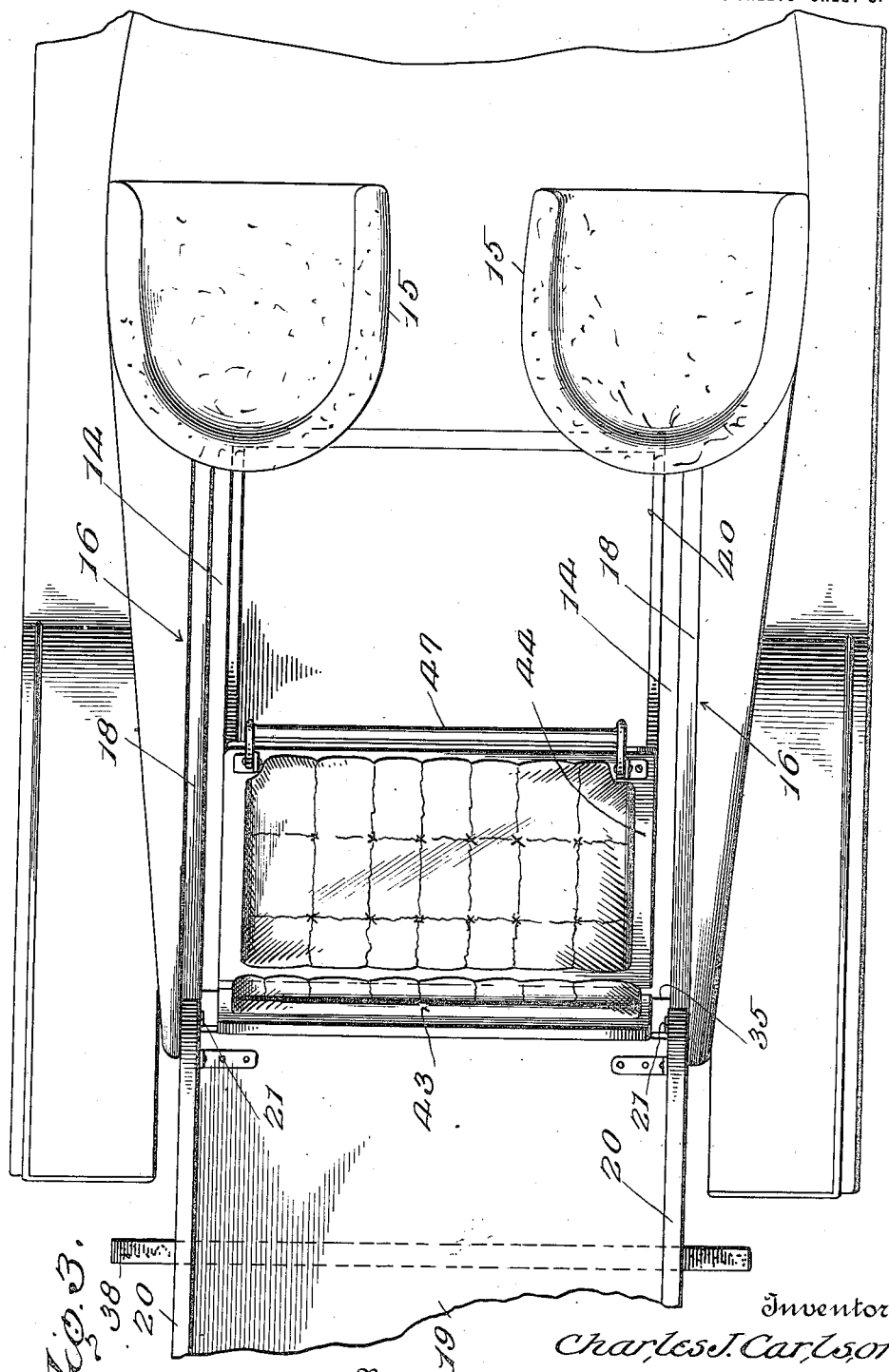

C. J. CARLSON.
CONVERTIBLE AUTOMOBILE BODY.
APPLICATION FILED SEPT. 15, 1917.
1,272,620.
Patented July 16, 1918.
4 SHEETS—SHEET 4.
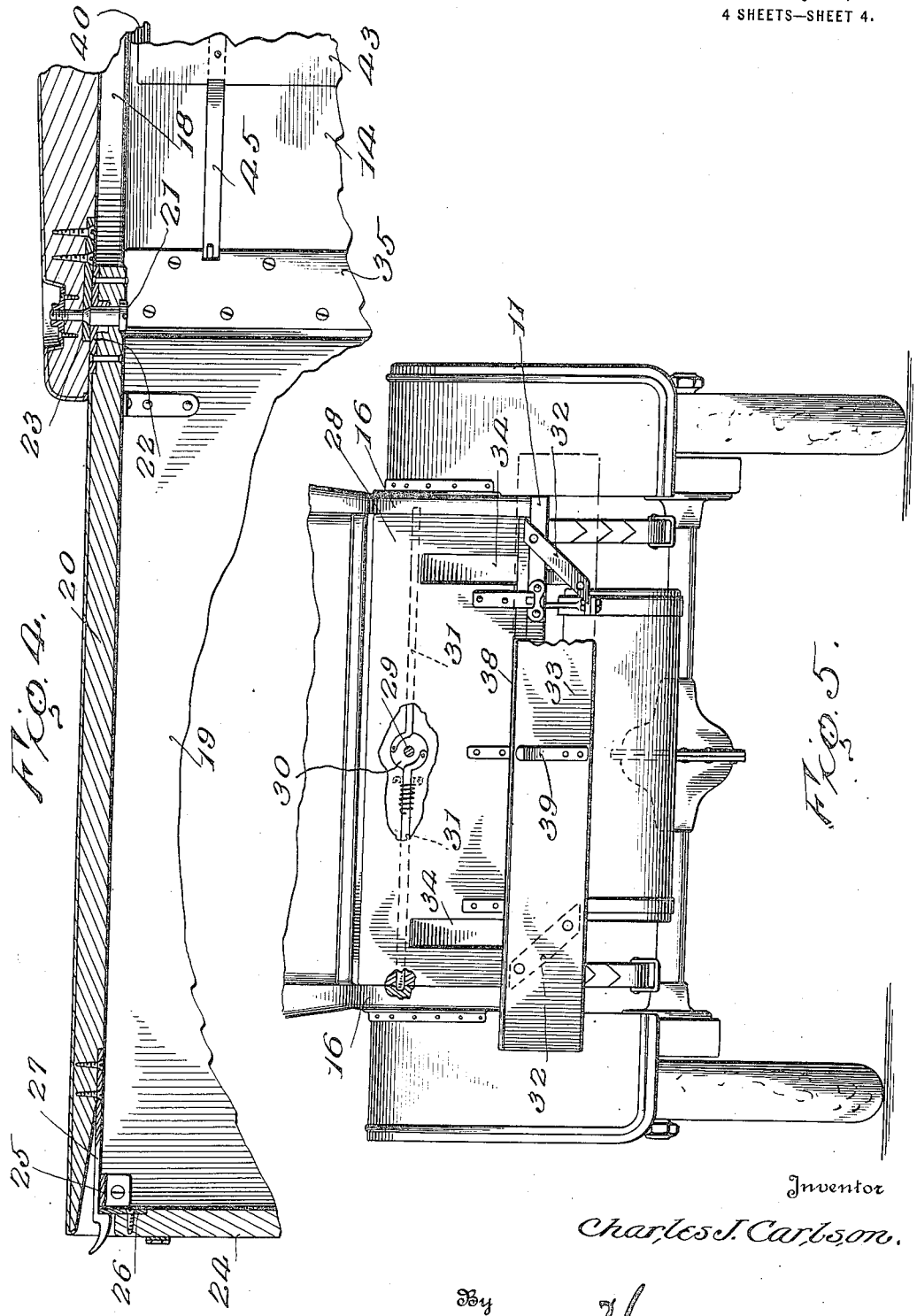
Inventor
Charles J. Carlson.
By
Attorneys.

UNITED STATES PATENT OFFICE.

CHARLES J. CARLSON, OF HELENA, MONTANA.

CONVERTIBLE AUTOMOBILE-BODY.

1,272,620.  Specification of Letters Patent.  Patented July 16, 1918.

Application filed September 15, 1917. Serial No. 191,602.

*To all whom it may concern:*

Be it known that I, CHARLES J. CARLSON, a citizen of the United States, residing at Helena, in the county of Lewis and Clark and State of Montana, have invented certain new and useful Improvements in Convertible Automobile-Bodies, of which the following is a specification.

This invention relates to an improved automobile body and has as its primary object to provide an arrangement wherein the body may be converted from a roadster body into a truck body.

The invention has as a further object to provide an arrangement wherein the roadster body will also be equipped with a rumble seat of such nature that the roadster may be used as a touring car.

A still further object of the invention is to provide a construction wherein the rumble seat and the back rest for the said seat will normally each form a section of the floor of the rumble compartment of the roadster body.

And the invention has as a still further object to provide a construction wherein the truck body will normally form the top section of the rumble compartment of the roadster body.

Other and incidental objects will appear as the description proceeds and in the drawings wherein I have illustrated the preferred embodiment of the invention and wherein similar reference characters designate corresponding parts throughout the several views:

Figure 1 is a fragmentary longitudinal sectional view of my improved convertible automobile body shown in connection with a conventional type of motor vehicle, this view illustrating the rumble compartment of the body closed, Fig. 2 is a similar view showing the rumble compartment open and illustrating the manner in which the top section of the rumble compartment is adapted to form a truck body.

Fig. 3 is a fragmentary plan view showing the disposition of the rumble seat when arranged in active position, Fig. 4 is a fragmentary sectional view showing the hinged mounting of the truck body, Fig. 5 is a rear elevation shown partly in section to illustrate the mounting of the supporting bracket for the truck body, and Fig. 6 is a detail perspective view illustrating the hinge bracket for the back rest of the rumble seat.

Referring more particularly to the drawings, I have shown my improved automobile body in connection with a conventional type of motor vehicle having a chassis frame 10 provided with a rear cross bar 11. In carrying out the invention, the improved vehicle body is formed with longitudinal sills 12 connected at their rear ends by a cross sill 13. Mounted upon the sills 12 is the floor 14 of a rumble compartment for the vehicle body. This rumble compartment is arranged in the rear of the seats 15 of the vehicle and, as shown in Fig. 3 of the drawings, an aisle is preferably provided between the said seats. The seats 15 may be of any approved character as may also the portion of the vehicle body in advance of the seats, the present invention having to do particularly with the construction of the rumble compartment and associated parts. However, it is to be observed that but two seats are provided and that the body of the vehicle partakes of the general nature of a roadster body. The rumble compartment, as previously referred to, is formed with side walls 16 which slope from the seats 15 downwardly to the rear end of the vehicle body. These side walls rise from the floor 14 of the said compartment and seating upon the said floor to rest against the inner faces of the said side walls are substantially triangular shaped blocks 17. These blocks are connected to the side walls in any approved manner and the upper edges thereof provide rearwardly sloping shoulders 18.

Normally closing the rumble compartment is a top section 19 therefor and, as shall presently appear, this top section is adapted to provide a truck body. The top section 19 includes a suitable bottom wall to which are connected side walls 20. These side walls are adapted to snugly fit between the side walls 16 of the rumble compartment and, at their inner extremities, are swingingly connected to the side walls 16 by pivot bolts 21. As shown in detail in Fig. 4 of the drawings, the side walls 20 of the said top section are provided with socket plates 22 arranged to seat against wear plates 23 set into the inner faces of the side walls 16 of the rumble compartment of the body. Securing the pivot bolts are suitable nuts engaging the outer ends of the said bolts and countersunk in the walls 16 of the rumble compartment. The top section 19 is open at its inner end and normally closing the outer end of the said section is an end gate 24 connected to the bottom wall of the said section by suitable hinges and arranged to abut stop plates 25 connected to the outer ends of the side walls 20 of the said section. Mounted upon the extremities of the end gate 24 adjacent its upper edge are catch plates 26 and arranged to engage the said plates are spring catches 27. These catches are set into the inner faces of the side walls 20 of the top section at their outer extremities, and are normally urged to coöperate with the plates 26 for holding the end gate closed.

In the normal position of the top section 19, the free edges of the side walls 20 thereof engage the shoulders 18 of the blocks 17 so that the said blocks thus support the top section to incline rearwardly from the seats 15 toward the rear end of the vehicle body in conformity with the side walls 16 of the rumble compartment. Closing the rumble compartment at its outer end is an end gate 28 connected to the cross bar 11 by suitable hinges and provided with a catch 29. As shown in detail in Fig. 5 of the drawings, this catch includes a rotatable catch plate 30 to which are pivotally connected catch rods 31 extending longitudinally of the end gate to project through the end edges thereof and shiftable upon the rotation of the said plate to engage in suitable sockets in the side walls 16 of the rumble compartment for holding the end gate closed. Thus it will be seen, as shown in Fig. 1 of the drawings, that when the top section 19 of the rumble compartment is in normal position, this compartment may be used for carrying various packages or accessories since access may be easily had to the said compartment by opening the end gate 28 thereof.

Connected to the side members 10 of the frame of the vehicle chassis are spaced rearwardly extending bracket arms 32 to the outer extremities of which is connected a channeled cross bar 33 forming a supporting bracket. The end gate 28 of the rumble compartment is, as more particularly shown in Fig. 5 of the drawings, provided with spaced recesses 34 adapted to receive the bracket arms 32 so that the said gate may be swung downwardly to open position resting upon the said bracket arms. When the gate 28 has thus been opened, the top section 19 of the rumble compartment may be swung rearwardly to inverted horizontal position resting, as shown in Fig. 2 of the drawings, upon the cross bar 33 of the supporting bracket therefor, with the bottom wall of the said top section arranged in alinement with the floor 14 of the rumble compartment. In this position of the top section 19, the said top section is, as will be clear, adapted to provide a truck body forming a continuation of the rumble compartment which may, of course, also be used in connection with the truck body. At its inner edge, the bottom wall of the top section 19 of the rumble compartment is arranged to seat against the cross sill 13 and connected to the floor 14 of the rumble compartment is a transverse wear strip 35 overlapping the joint between the floor and the said bottom wall. Fixed upon the bottom wall of the section 19 is a handle 36 in advance of which is arranged a transverse wear strip 37. This strip is disposed to seat against a cushion 38 upon the upper edge of the bracket cross bar 33 to prevent wear upon the said section as well as to overcome rattling between the parts. Mounted upon the said cross bar is a spring catch 39 arranged to engage the handle 36 to securely hold the top section in horizontal position. It will therefore be seen that a motor vehicle equipped with my improved body may be readily converted from a roadster into a truck.

The floor 14 of the rumble compartment is formed with an opening 40 below which is arranged a false floor 41 upon the side members 10 of the vehicle chassis. Normally closing the said opening is a floor section 43 and a coacting floor section 44. Swingingly supporting the floor section 43 are coacting arms 45 pivotally mounted upon suitable brackets secured to the side members 10. These arms are normally received within suitable recesses 46 in the floor 14 with the said floor section fitting within the rearward portion of the opening 40 in the said floor. The floor section 44 is swingingly connected to the sills 12 by a hinge bracket 47, shown in detail in Fig. 6 of the drawings. The arms of this bracket are, at their inner extremities, pivotally mounted upon the said sills and, at their outer extremities, are pivotally connected with the floor section 44 adjacent one side edge thereof. The hinge bracket 47 is, as shown in Fig. 1 of the drawings, normally disposed below the floor 14 with the floor section 44 fitting within the forward portion of the opening 40 in the said floor to coact with the floor section 43 for closing the said opening. The floor sections 43 and 44 are padded upon the lower sides thereof and, as shown in Fig. 2, the floor section 43 is arranged to be swung upwardly to upright position for forming a back rest. When the floor section 43 has been so disposed, the floor section 44 is then swung upwardly upon the bracket 47 and pivoted rearwardly thereon to assume an inverted position forming a rumble seat below the back rest. This provides a very simple arrangement whereby the rumble seat and back rest therefor may be arranged in active position and in this connection attention is directed to the fact that no extra parts are employed to form the said seat and rest since these parts, when in normal position, provide sections of the floor of the rumble compartment of the vehicle. The false floor 41 is, of course, provided to protect the feet of any persons riding upon the rumble seat.

Having thus described the invention, what is claimed as new is:

1. A vehicle body formed to provide a rumble compartment, a hinged top section for the said compartment, the said section being movable to inverted position projecting rearwardly from the said compartment to provide a truck body, bracket arms projecting rearwardly from the said compartment, a cross bar extending between the said arms to engage beneath the said section for supporting the said section in inverted position, and a cushion between the bar and the said section.

2. A vehicle body formed to provide a rumble compartment, a shiftable top section for the said compartment, the said compartment being formed with floor sections, and means for supporting the said floor sections for movement to a position providing a seat and back rest respectively.

3. A vehicle body formed to provide a rumble compartment, a shiftable top section for the said compartment, and floor sections for the said compartment shiftable to a position providing a seat and back rest respectively.

4. A vehicle body formed to provide a rumble compartment, a shiftable top section for the said compartment, the floor of the said compartment being formed with an opening, floor sections normally closing the said opening, and means for supporting the said floor sections for movement to a position providing a seat and back rest respectively.

5. A vehicle body formed to provide a rumble compartment, blocks mounted to extend along the side walls of the said compartment, a top section normally supported by the said blocks to close the compartment, the said top section being movable to inverted position coöperating with the compartment to provide a truck body, and means for supporting the said top section in such position.

6. A vehicle body formed to provide a rumble compartment, a top section for the said compartment movable to a position coöperating therewith for providing a truck body, a handle upon the top section, means spaced from the rear of the compartment for supporting the top section in the said position, and means upon said first mentioned means adapted for engagement with the handle for locking the top section in the said position.

7. A vehicle body formed to provide a rumble compartment, a hinged top section for the said compartment movable to inverted position coöperating therewith to provide a truck body, bracket arms projecting rearwardly from the said compartment, an end gate for the compartment movable to open position resting against said bracket arms to be supported thereby, and a cross bar extending between the said arms to engage beneath the said section for supporting the section in inverted position.

8. A vehicle body formed to provide a rumble compartment, a shiftable top section for the said compartment, the floor of the compartment being formed with an opening, a false floor extending beneath said opening, and floor sections normally closing the opening and movable to position providing a seat and back rest respectively above said opening, the false floor being adapted to receive the feet of an occupant of the said seat.

In testimony whereof I affix my signature.

CHARLES J. CARLSON. [L. S.]